United States Patent [19]

Ohara et al.

[11] Patent Number: 4,656,118
[45] Date of Patent: Apr. 7, 1987

[54] INFORMATION RECORDING MEDIUM USING LASER BEAM

[75] Inventors: Shinichiro Ohara; Yohnosuke Takahashi; Kyoichi Naruo; Fumiaki Shinozaki, all of Fujinomiya, Japan

[73] Assignee: Fuji Photo Film Co., Ltd., Japan

[21] Appl. No.: 771,192

[22] Filed: Aug. 30, 1985

[30] Foreign Application Priority Data

Aug. 30, 1984 [JP] Japan .................................. 59-182014

[51] Int. Cl.$^4$ ........................ G03C 1/80; G01D 15/10; G01D 15/14
[52] U.S. Cl. ..................................... 430/272; 430/945; 430/271; 428/441; 428/442; 428/438; 346/135.1; 346/76 L
[58] Field of Search ...................... 430/272, 945, 271; 346/135.1, 76 L; 428/441, 442, 438

[56] References Cited

U.S. PATENT DOCUMENTS 4,460,665  7/1984  Kunikane et al. ................... 428/441
4,499,178  2/1985  Wada et al. ......................... 430/276

FOREIGN PATENT DOCUMENTS 60-64894  4/1985  Japan ................................... 430/945

Primary Examiner—John E. Kittle
Assistant Examiner—Cynthia Hamilton
Attorney, Agent, or Firm—Ostrolenk, Faber, Gerb & Soffen

[57] ABSTRACT

An information recording medium comprising in order, a glass substrate; a layer for preventing diffusion of alkali metal ions and alkaline earth metal ions from the substrate; a thermal barrier layer, and an information recording layer for writing and/or reading information by means of laser beam.

14 Claims, 1 Drawing Figure

INFORMATION RECORDING MEDIUM USING LASER BEAM

BACKGROUND OF THE INVENTION

1. Field of the Invention

This invention relates to an information recording medium, and more particularly to an information recording medium for writing and/or reading information by means of laser beam of high energy density.

2. Description of Prior Arts

Information recording mediums utilizing a beam of high energy density such as laser beam have been developed in recent years and put to practical use. Such a recording medium is called an optical disc and the practical applications thereof have been found, for example, as video disc and audio disc as well as disc memory for large-capacity computer and large-capacity static image file.

The optical disc basically comprises a disc-shaped transparent substrate of a plastic or glass material and a recording layer composed of a metal such as Bi, Sn, In or Te or a semi-metal provided on said substrate. Writing of information on the optical disc can be conducted, for example, by irradiating the optical disc with a laser beam. Under irradiation with the laser beam, the irradiated area of the recording layer of the optical disc absorbs the energy of beam and a rise in temperature locally occurs. As a result, a chemical or physical change takes place to alter the optical characteristics of the recording layer in the irradiated area, whereby the information is recorded. Reading of information from the optical disc is conducted by irradiating the optical disc with a laser beam. The information can be reproduced by detecting reflected light or transmitted light corresponding to the alteration in the optical characteristics of the recording layer.

As a disc structure for protecting the recording layer, there has been recently proposed an air-sandwich structure in which a recording layer is provided on at least one of two disc-shaped substrates and positioned inside the two substrates opposed to each other at a given distance by interposing a ring-shaped inner spacer and a ring-shaped outer spacer between the substrates so as to form a closed space surrounded by these two substrates and these two spacers. In the optical disc having such a structure, the recording layer is not directly exposed to the atmosphere and the recording and reproduction of information is conducted with a laser beam passing through the substrate. Accordingly, in general there is no possibility that the recording layer is physically or chemically damaged or the surface thereof is polluted with dust which is to interfere with the recording and reproduction of information.

Previously, as described in Japanese Patent Provisional Publications No. 50(1975)-126237 and No. 57(1982)-205193, it is known that a thermal barrier layer can be provided to the optical disc to enhance the recording sensitivity. The thermal barrier layer is provided between the substrate and the recording layer and known to be made of an organic polymer such as polyester, polyethylene, polystyrene or acrylic polymer or made of a non-metallic compound such as silicon dioxide. This thermal barrier layer reduces loss of thermal energy given by the irradiation of a laser beam, the thermal loss taking place from the recording layer into the substrate layer through thermal conduction.

Further, it is known that a glass substrate such as a tempered glass substrate is employed as the substrate of the optical disc. The optical disc using a glass substrate is advantageous in that it rotates more stably, the surface thereof is harder, and the dimensional stability is higher, as compared with the optical disc using a plastic substrate such as a substrate of an acrylic resin.

In the course of study on the optical disc, the present inventors have noted that alkali metal ions such as $Na^+$ and $K^+$ and alkaline earth metal ions such as $Mg^{2+}$ and $Ca^{2+}$ (both are hereinafter represented by a term "alkali ions") contained in the glass substrate is apt to diffuse out on the surface of the substrate under influence of circumferential conditions such as temperature and humidity. The diffusing alkali ions likely give adverse effects on the recording layer provided on the substrate. In more detail, the alkali ions cause alteration of the characteristics of the recording layer as the diffusion progresses. Such alteration results in a decrease of the recording sensitivity, decrease of optical density utilized for reading the recorded information, decrease of bonding between the substrate and the recording layer, and/or deposition of precipitate between the substrate and the recording layer. These sometimes trigger abnormal functions of the recording medium.

The assignee of the present application has already filed a patent application (Japanese Patent Application No. 58(1983)-173676) disclosing an invention in which the glass substrate is undercoated with a polymer having a hydrophilic group to prevent the unfavorable effect of the alkali ions diffusing from the substrate. In more detail, this invention comprises providing between the substrate and the recording layer and undercoating layer of a polymer having a hydrophilic group such as carboxylic group to keep the recording layer from suffering from adverse effect of alkali ions liberated onto the surface of the substrate.

The material utilized for the aforementioned thermal barrier layer shows little ability to prevent the diffusion of the alkali ions. Thus, the constitution of the information recording medium of prior art comprising a glass substrate, a thermal barrier layer and a recording layer in order is not effective to keep the recording layer from the adverse effect of alkali ions. Therefore, the recording medium of prior art is liable to decrease in the recording sensitivity and to deteriorate in the quality of recorded information in the course of storage thereof. Further, an intermediate layer such as a metallic reflecting layer disclosed in the aforementioned Japanese Patent Provisional Publication No. 57(1982)-205163 is not effective to prevent the diffusion of alkali ions.

As described hereinbefore, the information recording medium is of a great value in a variety of arts. Accordingly, it is desired that the recording sensitivity is as high as possible, that the recording layer is kept stable as long as possible, and that error in reading the recorded information is as little as possible.

SUMMARY OF THE INVENTION

It is an object of the present invention to provide an information recording medium which is improved in the sensitivity and the preservablity of the recording layer.

The present invention provides an information recording medium comprising:

a glass substrate; a layer for preventing diffusion of alkali metal ions and alkaline earth metal ions from the substrate (this layer is referred to hereinafter as alkali diffusion-preventing layer); a thermal barrier layer, and an information recording layer for writing and/or reading information by means of laser beam. These layers are arranged in this order.

As a preferred embodiment of the present invention, there can be mentioned an information recording medium which comprises a glass substrate, an alkali diffusion-preventing layer of styrene-maleic anhydride copolymer, a thermal barrier layer of poly(methyl methacrylate) and/or nitrocellulose, and a recording layer of a combination of indium and germanium sulfide, these layer being arranged in this order.

DETAILED DESCRIPTION OF THE INVENTION

Figure 1:
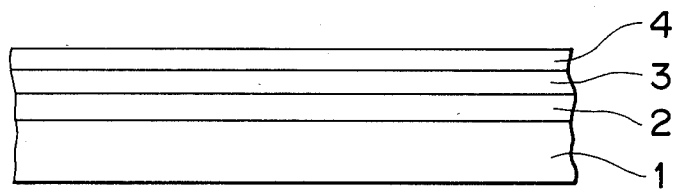
FIG. 1 is a vertical section illustrating a basic constitution of an information recording medium according to the present invention.

According to the present invention, the recording sensitivity and preservability of the recording layer of an information recording medium using a glass substrate are effectively improved by providing an alkali diffusion-preventing layer and a thermal barrier layer in this order between the substrate and the recording layer.

The alkali diffusion-preventing layer provided on the surface of the glass substrate effectively prevents diffusion of alkali metal ions and/or alkaline earth metal ions from the glass substrate into the recording layer. Under the provision of the alkali diffusion-preventing layer, the decrease of sensitivity, occurrence of defective reading, such as detection of abnormal signals, and decrease of bonding between the recording layer and the substrate which arrise from alteration of the characteristics of the recording layer are prevented or at least remarkably reduced.

The diffusion of the alkali ions can be effectively prevented by providing a layer comprising a polymer layer having hydrophilic group and/or maleic anhydride group, whereby trapping the introduced alkali ion with the hydrophilic group or maleic anhydride group.

According to the study of the present inventors, a styrene-maleic anhydride copolymer among polymers having a hydrophilic group and/or maleic anhydride group is most effective to prevent the diffusion of alkali ions.

On the alkali diffusion-preventing layer, a thermal barrier layer is provided to reduce loss of thermal energy from the recording layer to the substrate so as to enhance the efficiency of thermal energy introduced into the recording layer. The recording sensitivity is thus markedly enhanced. It has been noted that the thermal barrier effect is prominently high in the case that the thermal barrier layer is made essentially of poly(methyl methacrylate) and/or nitrocellulose.

The recording layer arranged on the thermal barrier layer is preferably made of a combination between indium and germanium sulfide to efficiently decrease reflection of laser beam, thereby further increasing the recording sensitivity.

According to the invention, the alkali diffusion-preventing layer and the thermal barrier layer should be arranged in the aforementioned specific order, namely, the substrate, the alkali diffusion-preventing layer, the thermal barrier layer and the recording layer. If an order of the glass substrate, the thermal barrier layer, the alkali diffusion-preventing layer and the recording layer is adopted, the thermal barrier layer is likely deteriorated or deformed by the alkali ions supplied from the substrate. A deteriorated or deformed thermal barrier layer does not serve satisfactorily as the thermal barrier. Moreover, the deteriorated or deformed thermal barrier layer gives adverse effects to the recording layer. Thus, the information recording medium of the latter constitution which is not in accordance with the invention shows excessive reading errors after storage of the recorded medium. Accordingly, this recording medium is not satisfactory not only in the recording sensitivity but also in the preservability.

The information recording medium of the invention comprises, for instance, a composite structure of a substrate 1, an alkali diffusion-preventing layer 2, a thermal barrier layer 3 and a recording layer 4 as schematically illustrated in FIG. 1. Any known functional layer can be provided on the surface of the substrate or the recording layer or between the constitutional layers. Examples of known functional layer include a reflection layer, a reflection-preventing layer, and a protective layer.

While the representative constitution of the information recording medium of the invention can take the simple composite structure of FIG. 1, the recording medium can comprise a plurality of the composite units of the FIG. 1 in which the composite units of FIG. 1 are combined via an adhesive in such a manner that the recording layers of both units faces each other. Otherwise, the composite units of FIG. 1 are so combined via spacers to form an air-sandwich structure in which the recording layers face each other.

The information recording medium of the invention can be prepared, for instance, by the following procedures.

The substrate employed in the invention is prepared from a glass plate, and preferably from a tempered glass plate which is excellent in the dimensional stability, transparency and planeness.

On the surface of the substrate on the side to receive the recording layer is formed an alkali diffusion-preventing layer which serves for preventing diffusion of alkali metal ions ($Na^+$, $K^+$, etc.) and alkaline earth metal ions ($Mg^{2+}$, $Ca^{2+}$, etc.) from the glass substrate to other layers.

As the material of the alkali diffusion-preventing layer, there can be mentioned a polymer having a hydrophilic group such as carboxyl group, sulfinic acid, hydroxyl group, amido group or cyano group, as described in the aforementioned Japanese Patent Application No. 58(1983)-173676, and a polymer having a maleic anhydride group. The above-mentioned functional group is preferably included in such a manner that at least one functional group is attached to one monomer unit of the polymer. The polymer generally has a molecular weight ranging from 10 to $3 \times 10^5$, preferably from $1 \times 10^2$ and $1 \times 10^5$. Examples of the polymer employable for the formation of the alkali diffusion-preventing layer include homopolymers and copolymers of (meth)acrylic acid, itaconic acid, crotonic acid, fumaric acid, maleic acid and maleic anhydride; polyhexamethylenesulfonic acid, polyoxyhexamethylenesulfonic acid, polystyrenesulfonic acid, polyvinylsulfonic acid, homopolymers and copolymers of vinyl alcohol, 2-hydroxyethyl acrylate, 2-hydroxyethyl methacrylate, 2-hydroxymethyl acrylate and 2-hydroxymethyl acrylate; polyamides such as nylon 6 and nylon 66; polypeptide; gelatin; acrylamide polymer; homopolymers and copolymers of acrylonitrile, methacrylonitrile, α-chloroacrylonitrile and α-chloromethacrylonitrile.

The alkali metal ions and alkaline earth metal ions liberated from the glass substrate can be trapped directly by the functional groups of the polymer, or can be trapped by water molecules attached to the functional groups.

The polymer having a hydrophilic group further gives an effect to improve the sharpness of pit outlines, whereby resulting in enhancement of S/N ratio in the case that the recording is done by forming pits on the recording layer.

Among the above-described polymers, a polymer having a carboxyl group and/or maleic anhydride group are preferred, and a styrene-maleic anhydride copolymer is most preferred.

The alkali diffusion-preventing layer can be formed by the following procedures.

The polymer is dissolved in a solvent to prepare a coating solution. Examples of the solvent include alcohols such as methanol, ethanol, propanol and butanol; ketones such as acetone, methyl ethyl ketone and methyl isobutyl ketone; diacetonealcohol; cellosolve derivatives such as methylcellosolve, ethylcellosolve, butylcellosolve, methylcellosolve acetate and ethylcellosolve diacetate; dimethylformamide; and thinner. The solvent is so selected as to match the nature of the employed polymer.

The polymer-containing coating solution can further contain an optional additive such as a plasticizer or a lubricant.

The coating solution is then applied to the surface of the substrate by a conventional coating procedure such as spraying, spin coating, dipping, roller coating, blade coating, doctor roll coating or screen printing. The coated solution is dried to give an alkali diffusion-preventing layer. The thickness of the alkali diffusion-preventing layer generally is in the range of 0.01 to 20 $\mu$m, preferably 0.1 to 2.0 $\mu$m.

On the alkali diffusion-preventing layer is formed a thermal barrier layer to prevent diffusion of thermal energy given by irradiation of laser beam, the diffusion likely taking place from the recording layer to other layers via thermal conduction.

The thermal barrier layer can be formed from a known thermal insulating material. Examples of the employable insulating material include organic polymers such as polyester, polyethylene, polystyrene, polyurethane, acrylic polymers, cellulose derivatives (e.g., cellulose acetate and cellulose nitrate), brominated polyhydroxystyrene and chlorinated rubber; and inorganic materials such as SiO and $SiO_2$. Most preferred are cellulose nitrate and poly(methyl methacrylate).

The material of the thermal barrier layer is dispersed or dissolved in an appropriate solvent to prepare a coating solution or dispersion. The coating solution or dispersion is then applied to the surface of the alkali diffusion-preventing layer by a conventional coating procedure such as spraying, spin coating, dipping, roller coating, blade coating, doctor roll coating or screen printing. The coated solution is dried to give a thermal barrier layer. The thickness of the thermal barrier layer generally is in the range of 0.01 to 20 $\mu$m, preferably 0.05 to 1.0 $\mu$m.

On the thermal barrier layer is formed a recording layer.

Examples of material employed for the formation of the recording layer include metals such as Te, Zn, In, Sn, Zr, Al, Cu and Ga; semi-metals such as Bi, As and Sb; semiconductors such as Ge and Si; and alloys therof and combinations thereof. Sulfides, oxides, halides, borides, silicides, carbides and nitrides of these metals and these semi-metals as well as mixtures of these compounds and the above-stated metals can also be employed for the same purpose. In the present invention, the recording layer is preferably composed of a combination of In and GeS. In this case, In is preferably contained in the recording layer in an amount from 33.3 to 87.5% by weight based on the total amount of the recording layer.

The recording layer can be formed by means of metallizing, sputtering or ion plating procedue. The recording layer may be composed of a single layer or plural layers. The thickness of the recording layer is generally in the range of 100 to 5,500 angstroms, preferably 200 to 1,000 angstroms from the viewpoint of optical density required for the optical recording.

When the recording medium is dedicated to reproduction only, a fine pattern of recess and protrusion is previously formed on one side of the substrate by means of a stamper and, after the formation of the required layers (i.e., alkali diffusion-preventing layer and thermal barrier layer), a layer of a reflecting material such as Al or Cu may be then formed thereon.

A thin film of an inorganic material such as silicon dioxide, tin oxide or manganese fluoride may be formed on the free surface of the substrate (the surface not facing the recording layer) by vacuum metallizing or sputtering procedure in order to increase resistance to damage and moisture proofness.

Thus, an information recording medium comprising a substrate, an alkali diffusion-preventing layer, a thermal barrier layer and a recording layer in this order is prepared.

If desired, a couple of the thus prepared mediums are combined via an adhesive agent to prepare a composite type medium. If the air-sandwich type recording medium is desired, a couple of the thus prepared mediums are bonded to each other via an adhesive agent by interposing spacers therebetween in such a manner that the recording layer is positioned inside the substrates.

The present invention is further illustrated by the following examples.

EXAMPLE 1

A substrate is lime soda glass in the form of a disc (outer diameter: 305 mm, inner diameter: 90 mm, thickness: 1.33 mm) was rinsed successively with an alkali solution and isopropyl alcohol, and dried.

Independently, a styrene-maleic anhydride copolymer was dissolved in a mixture of methyl ethyl ketone and methylcellosolve acetate (1:1, volume ratio) to prepare a 2% styrene-maleic anhydride copolymer solution (coating solution).

The coating solution was applied to the surface of the glass substrate by means of a spinner at a rotation of 1,000 rpm, and the coated layer was dried at 120° C. for 5 min. to prepare an alkali diffusion-preventing layer of 1.0 $\mu$m thick.

Then, poly(methyl methacrylate) was dissolved in a mixture of toluene and methylcellosolve (4:1, volume ratio) to prepare a 2% poly(methyl methacrylate) solution (coating solution). The coating solution was applied on the surface of the alkali diffusion-preventing layer by means of a spinner in the same manner to prepare a thermal barrier layer of 0.5 $\mu$m thick.

On the thermal barrier layer was formed a recording layer of a combination of In and GeS (In content amounted to 50% by weight, and the thickness was 350 angstroms) by vacuum vapor deposition.

Thus, an information recording medium comprising a substrate, an alkali diffusion-preventing layer, a thermal barrier layer and a recording layer in this order is prepared.

COMPARISON EXAMPLE 1

The procedures of Example 1 were repeated except that the thermal barrier layer was directly formed on the substrate with no formation of the alkali diffusion-preventing layer therebetween.

Thus, an information recording medium comprising a substrate, a thermal barrier layer and a recording layer in this order is prepared.

COMPARISON EXAMPLE 2

The procedures of Example 1 were repeated except that the recording layer was directly formed on the alkali diffusion-preventing layer with no formation of the thermal barrier therebetween.

Thus, an information recording medium comprising a substrate, an alkali diffusion-preventing layer and a recording layer in this order is prepared.

COMPARISON EXAMPLE 3

The procedures of Example 1 were repeated except that the thermal barrier layer was directly formed on the substrate and then the alkali diffusion-preventing layer was formed on the thermal barrier layer.

Thus, an information recording medium comprising a substrate, a thermal barrier layer, an alkali diffusion-preventing layer and a recording layer in this order is prepared.

EVALUATION OF INFORMATION RECORDING MEDIUM

The information recording mediums prepared in the examples were allowed to stand in a thermostat 60° C., 90% RH for 3–30 days. The recording mediums were then evaluated according to the following sensitivity test and recorded information-reproducing test.

(1) Sensitivity Test

On the recording medium under rotation (515 rpm) was recorded an information by forming pits on the recording layer at the circle area (diameter 290 mm) by means of a semiconductor laser (wavelength 820 nm) at 1.25 MHz and a duty ratio of 1:1. In this procedure, the minimum power of laser required for the formation of pits was determined. Accordingly, the lower power value means a higher sensitivity.

(2) Recorded Information-Reproducing Test

The information recording medium on which the information was recorded in the test (1) above was subjected to reproducing procedure using a recorded information-reproducing apparatus. In this procedure, the shapes of the reproduction signals were observed. Further, the conditions of the thermal barrier layer were microscopically observed.

The evaluation was made using the following three classes.

A: No abnormal signal was observed, and no bubble was contained in the thermal barrier layer.

B: A few abnormal signals were observed, and a small number of bubbles were contained in the thermal barrier layer.

C: No normal signals were obtained, and a large number of bubbles having a size of approx. 2–3 μm were contained in the thermal barrier layer.

The results are set forth in Table 1.

TABLE 1

|  | Sensitivity (mW) | Information Reproduction (period of storage) |
|---|---|---|
| Example 1 | 9.0 | A (30 days) |
| Com. Example 1 | 9.0 | C (3 days) |
| Com. Example 2 | 10.8 | A (30 days) |
| Com. Example 3 | 9.0 | C (3 days) |

As is clear from the results in Table 1, the information recording medium of the invention showed a high sensitivity, and no abnormal signal appeared on the reproduction of the recorded information after the 30 days storage at the above-mentioned severe conditions. Thus, no difficulty was noted for reading the recorded information.

In contrast, bubbles of methanol produced through decomposition of poly(methyl methacrylate) in the presence of alkali ions supplied for the glass substrate were noted in the thermal barrier layer within 3 days storage in the cases of the conventional recording medium having no alkali diffusion-preventing layer (Comparison Example 1) and a recording medium in which the alkali diffusion-preventing layer was provided between the thermal barrier layer and the recording layer. The thus produced bubbles in the thermal barrier layer deformed the adjoining recording layer, and accordingly normal reproduction signals were hardly obtained.

In the recording medium having no thermal barrier layer (Comparison Example 2), the recording sensitivity was apparently lower than that of the present invention (Example 1).

EXAMPLE 2 AND COMPARISON EXAMPLES 4 & 5

Example 1 and Comparison Examples 1 & 3 were all repeated except that the thermal barrier layer was prepared from nitrocellulose in place of the poly(methyl methacrylate). Almost same results were obtained, except that the thermal barrier layer of the recording medium of Comparison Examples 4 & 5 was deformed with no production of bubbles.

We claim:

1. An information recording medium comprising, in order:
   a glass substrate; a layer for preventing diffusion of alkali metal ions and alkaline earth metal ions from the substrate; a thermal barrier layer, and an information recording layer for writing and/or reading information by means of laser beam.

2. The information recording medium as claimed in claim 1, wherein the layer for preventing diffusion of alkali metal ions and alkaline earth metal ions from the substrate comprises a polymer having a hydrophilic group and/or maleic anhydride group.

3. The information recording medium as claimed in claim 2, wherein the hydrophilic group is at least one functional group selected from the group consisting of carboxyl, sulfonic, hydroxyl, amido and cyano groups.

4. The information recording medium as claimed in claim 2, wherein the polymer having a hydrophilic group and/or maleic anhydride group is a styrene-maleic anhydride copolymer.

5. The information recording medium as claimed in claim 1, wherein the thermal barrier layer comprises an acrylic polymer and/or a cellulose derivative.

6. The information recording medium as claimed in claim 5, wherein the acrylic polymer is poly(methyl methacrylate).

7. The information recording medium as claimed in claim 5, wherein the cellulose derivative is nitrocellulose.

8. The information recording medium as claimed in claim 1, wherein the recording layer comprises a combination of a metal or semi-metal and a compound of metal or semimetal selected from the group consisting of sulfide, oxide, halide, boride, silicide, carbide and nitride of metal or semi-metal.

9. The information recording medium as claimed in claim 8, wherein the recording layer comprises a combination of indium and germanium sulfide.

10. The information recording medium as claimed in claim 9 wherein the layer for preventing diffusion of alkali metal ions and alkaline earth metal ions from the substrate comprises a styrene-maleic anhydride copolymer and the thermal barrier layer comprises poly(methyl methacrylate) or nitrocellulose.

11. The information recording medium as claimed in claim 10, wherein the styrene-maleic anhydride copolymer layer has a thickness of 0.01 to 20 microns and the thermal barrier layer has a thickness of 0.01 to 20 microns.

12. The information recording medium as claimed in claim 11 in which the styrene-maleic anhydride copolymer layer has a thickness of 0.1 to 2 microns, the thermal barrier layer has a thickness of 0.05 to 1 micron and the indium is 33.3 to 87.5% of the recording layer.

13. The information recording medium as claimed in claim 8 wherein the layer for preventing diffusion of alkali metal ions and alkaline earth metal ions from the substrate comprises a polymer having a hydrophilic group and/or maleic anhydride groups and wherein the thermal barrier layer comprises an acrylic polymer and/or a cellulose derivative.

14. The information recording medium as claimed in claim 2 wherein the thermal layer comprises an acrylic polymer and/or cellulose derivative.

* * * * *